T. E. MURRAY Jr., AND J. B. MURRAY.
HOUSING FOR TRANSMISSION GEARS AND AXLES OF AUTOMOBILES.
APPLICATION FILED FEB. 20, 1920.
1,384,480.
Patented July 12, 1921.
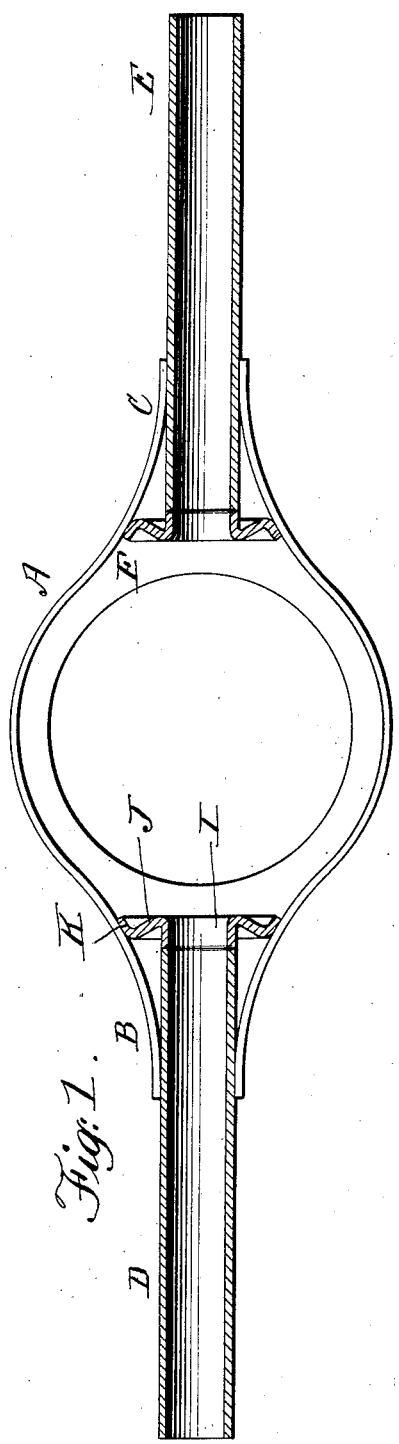
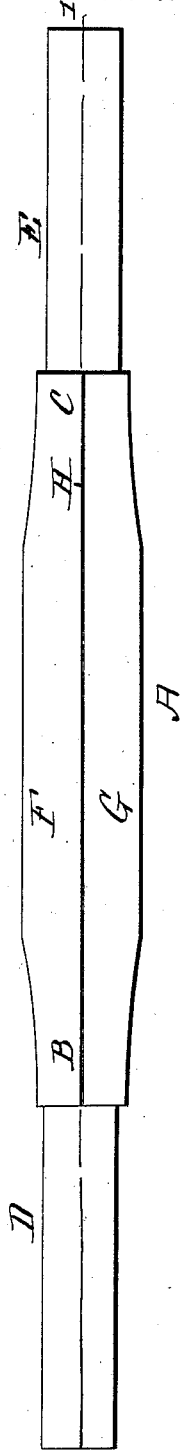

UNITED STATES PATENT OFFICE.

THOMAS E. MURRAY, JR., AND JOSEPH B. MURRAY, OF BROOKLYN, NEW YORK.

HOUSING FOR TRANSMISSION-GEARS AND AXLES OF AUTOMOBILES.

1,384,480. Specification of Letters Patent. Patented July 12, 1921.

Application filed February 20, 1920. Serial No. 360,064.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Housings for Transmission-Gears and Axles of Automobiles, of which the following is a specification.

The invention relates to a housing for the transmission gears and axles of an automobile and consists in the construction of said housing. The object is to simplify and cheapen said construction.

In the accompanying drawing—

Figure 1 is a longitudinal section of our housing on the line 1, 1 of Fig. 2. Fig. 2 is an edge view.

Similar letters of reference indicate like parts.

A is the middle section of the housing which is preferably made of sheet metal. Said section in form is substantially annular with oppositely disposed tapered tubular extensions B, C. When the housing is in place the annular portion of section A incloses the transmission gears, and the axles driven thereby pass through the extensions B, C, and also through the tubes D and E which are united respectively to said extensions. The middle section A is formed of two like longitudinal half sections F and G, struck up, pressed or stamped from sheet metal, which are electrically welded together at their registering edges, one of the welded joints being shown at H, Fig. 2.

The tubes D and E enter the tapered extensions B, C, and, are electrically welded thereto. To the inner end of each tube is butt-welded a ring I having a flange J, the circumferential edge K of which is inclined to fit against the inner tapered surface of the extension receiving said ring. Said inclined edges K of the rings I are electrically welded to the extensions, so that said rings form abutments for the ends of the tubes D, E, and also furnish an internal support for the half sections F, G.

We claim:

1. A housing for transmission gear and axle, comprising a middle section in form substantially annular with oppositely disposed tubular extensions and formed in two longitudinal half sections electrically welded together at their registering edges, a flanged ring in each of said extensions and electrically welded thereto at its circumferential periphery, and tubes entering said extensions and electrically welded to said rings; the said rings being butt-welded to the ends of said tubes.

2. A housing for transmission gear and axle, comprising a middle section in form substantially annular with oppositely disposed tubular extensions and formed in two longitudinal half sections electrically welded together at their registering edges, a flanged ring in each of said extensions and electrically welded thereto at its circumferential periphery, and tubes entering said extensions and electrically welded to said rings; the said rings being butt-welded to the ends of said tubes and having their flanges everywhere in contact with and united to the inner tapered surfaces of said extensions.

In testimony whereof we have affixed our signatures in presence of two witnesses.

THOMAS E. MURRAY, JR.
JOSEPH B. MURRAY.

Witnesses:
GERTRUDE T. PORTER,
MAY T. McGARRY.